UNITED STATES PATENT OFFICE.

ISAAC B. HARRIS, OF NEWTOWN, CONNECTICUT.

IMPROVEMENT IN THE MANUFACTURE OF INDIA-RUBBER HOSE.

Specification forming part of Letters Patent No. 132,006, dated October 8, 1872.

*To all whom it may concern:*

Be it known that I, ISAAC BLUE HARRIS, of Newtown, in the State of Connecticut, have invented certain Improvements in the Manufacture of India-Rubber Hose, of which the following is a specification:

This invention relates to that description of ply-hose called suction-hose, heretofore manufactured of India rubber, or India-rubber compounds, in combination with cotton, flax, linen, canvas, or cloth; and consists in protecting from displacement the coils of metallic wire or coils of metallic hoop-iron or loose rings employed in keeping the flexible canvas and India-rubber materials of such hose or tubes distended against atmospheric or other external pressure. These wires, or hoops, or rings, have hitherto been made of copper, brass, or galvanized iron, or other metallic substance, and have either been exposed to the action of the fluid or material conveyed through the hose, or have been coated with a water-proof material before being applied to the hose, or have been laid around a rubber tube covered with a ply of cloth and embedded between the external and internal surfaces of the hose. The process of cementation of the several layers of rubber and canvas employed in the manufacture of this hose has been accomplished by a rolling pressure applied externally thereto, and resisted by an internal rigid pipe or mandrel filling, and forming the bore of the hose while in the process of manufacture, and the spaces between the spirals of such wires, hoops, or rings, have been filled with a compound of India rubber forming the medium for the cementation or adhesion of the outside to the inside coverings of the wires, hoops, or rings; or the outside coverings have been pressed inward between said spirals or rings so as to come in contact with the same and thus effect the cementation of the several parts. Instead of this process I form the outside coverings and apply them outside of the bare or uncoated wires, hoops, or rings first, and press them inward so as to effect the cementation thereof as heretofore, and I afterward introduce an inside covering for the metallic spirals or rings. This inside covering I form of a plastic or yielding rubber tube, and inside of this tube, when introduced into the hose, I apply hydraulic, or gaseous, or steam pressure. By this means the inner tube is forced outward against the wires, hoops, or rings, and also against the surface of their immediate outside covering, there being no filling inserted as heretofore (in the making of ply-hose) between the coils of wire. In order to insure a proper adhesion of the plastic rubber tube with the external covering of the rings it is necessary to provide for the escape of the air inclosed between the two surfaces. When a spiral wire is to be imbedded the channel formed by the coils is made to communicate at both ends with the atmosphere by the insertion therein of a fine tube; or instead of these tubes porous threads may suffice to open up the channel to the atmosphere. As the pressure is applied to the internal tube to effect its expansion the air contained between the coils will travel toward the ends of the hose and finally make its escape through the tubes or the pores of the inserted thread. When using rings the air will be imprisoned in annular spaces by the expanding tube; a somewhat different contrivance, therefore, is required to enable the imprisoned air to escape. In this case I carry the porous thread or threads through the hose, looping the thread around each ring in succession, and carrying the extremities of the thread or threads beyond the ends of the hose. Thus, when hydraulic, gaseous, or steam pressure is applied to the inserted plastic rubber tube, not only are the metallic portions very perfectly covered, but the inside lining is also forced between the coils or the rings into close contact with the outside covering, and a more perfect cementation of the two between the wires, hoops, or rings is secured than could be effected by applying a rolling pressure outside the hose, as heretofore. By thus thoroughly covering the metallic portions of such hose I effectually protect them from ordinary or induced oxidation or corrosion, and also remove the tendency to displacement of said metallic portions while the hose is in use.

In order that my invention may be clearly understood I subjoin a sheet of illustrative drawing comprising three longitudinal sectional figures of hose-pipe, made according to my invention. In all of these figures, A represents the outside layer of rubber, and B the canvas or cloth ply layer or layers, which, to-

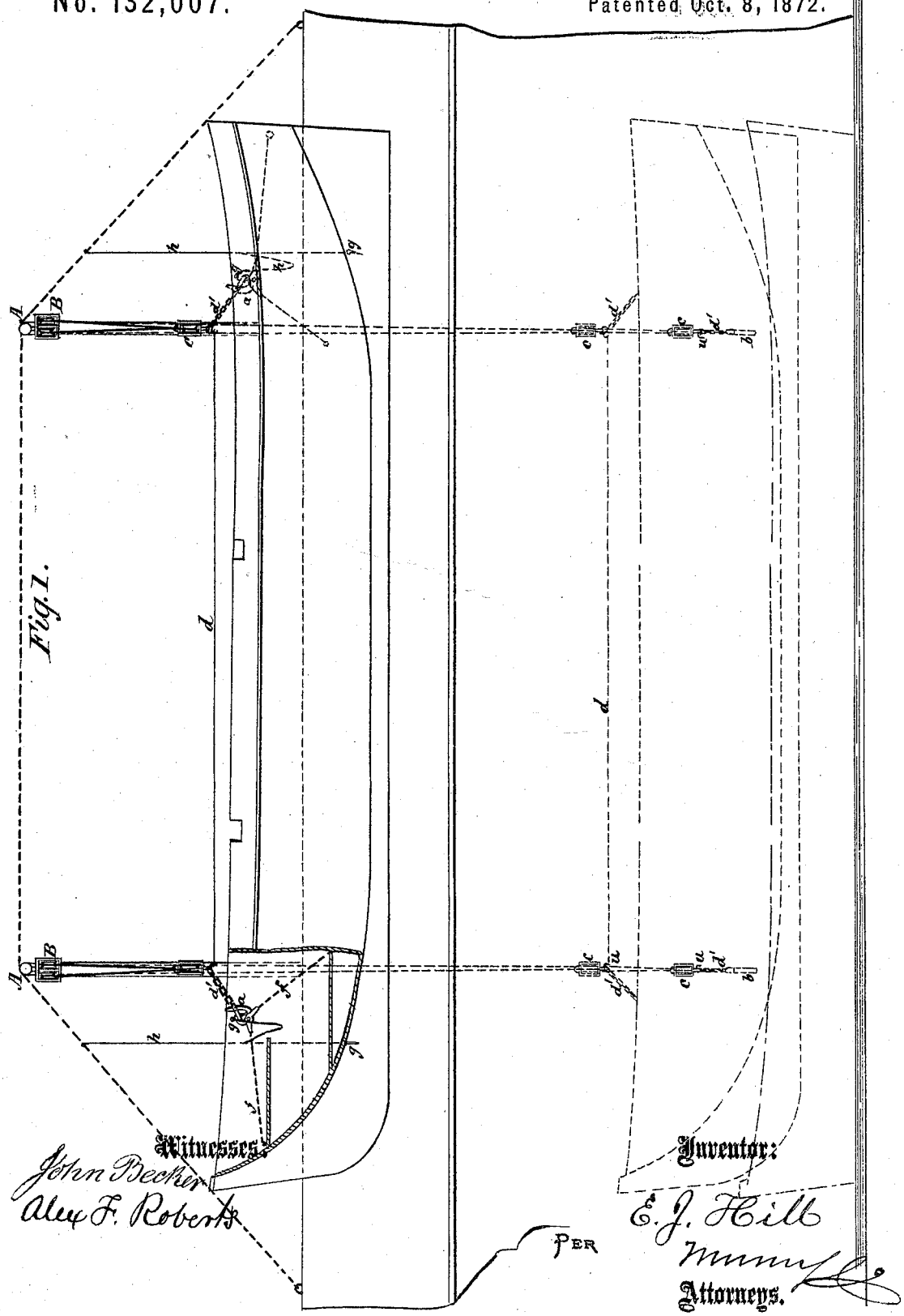

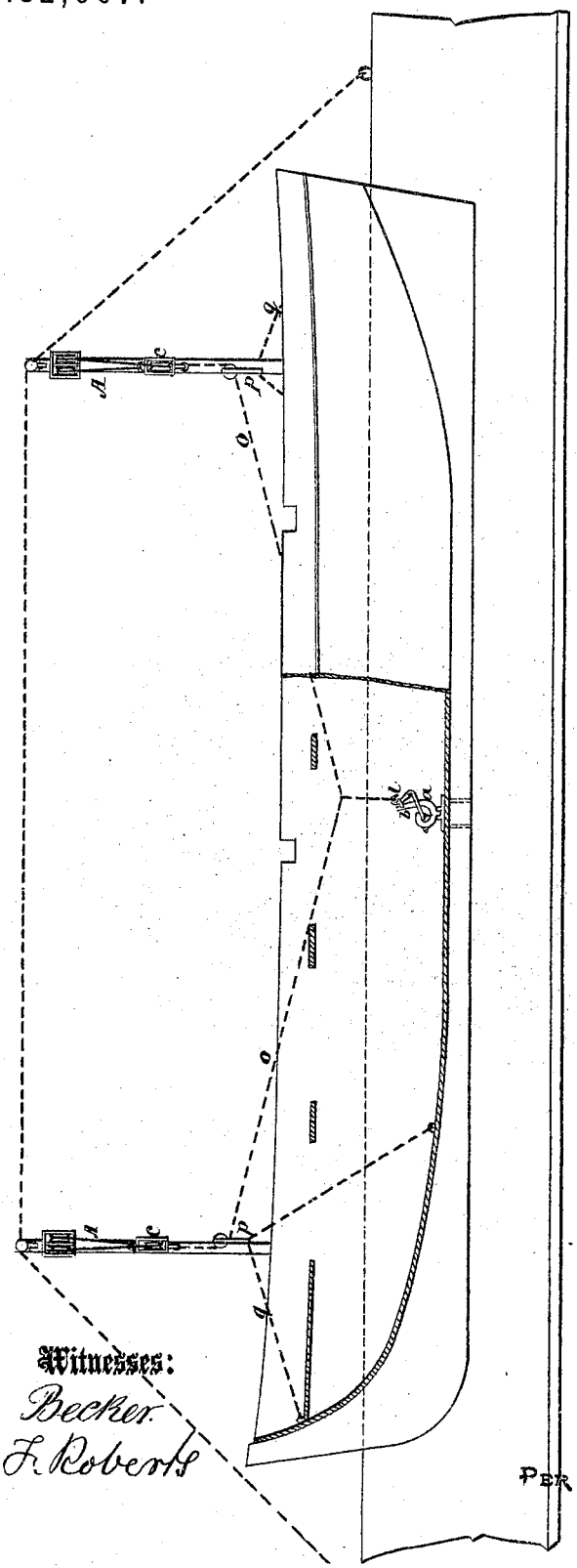

4 Sheets--Sheet 4.
E. J. HILL.
Improvement in Boat-Detaching Apparatus.
No. 132,007.             Patented Oct. 8, 1872.
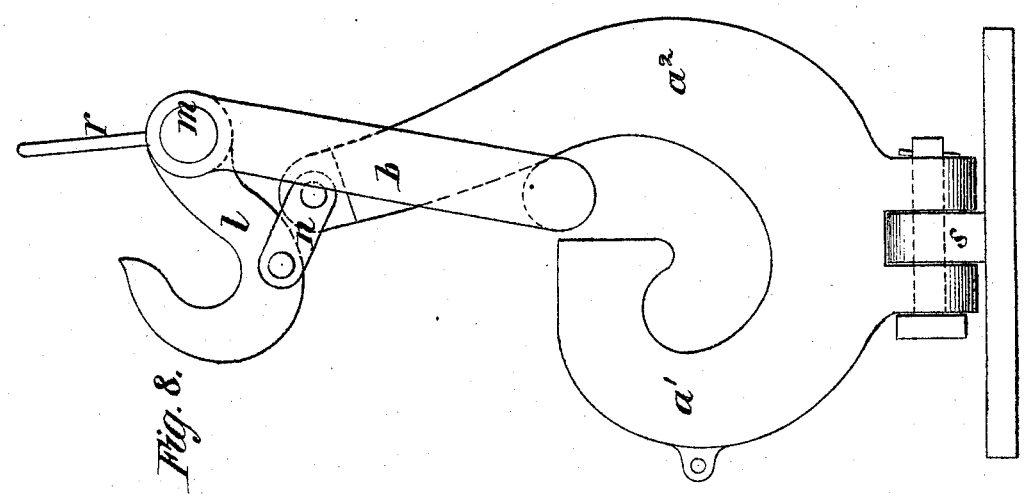
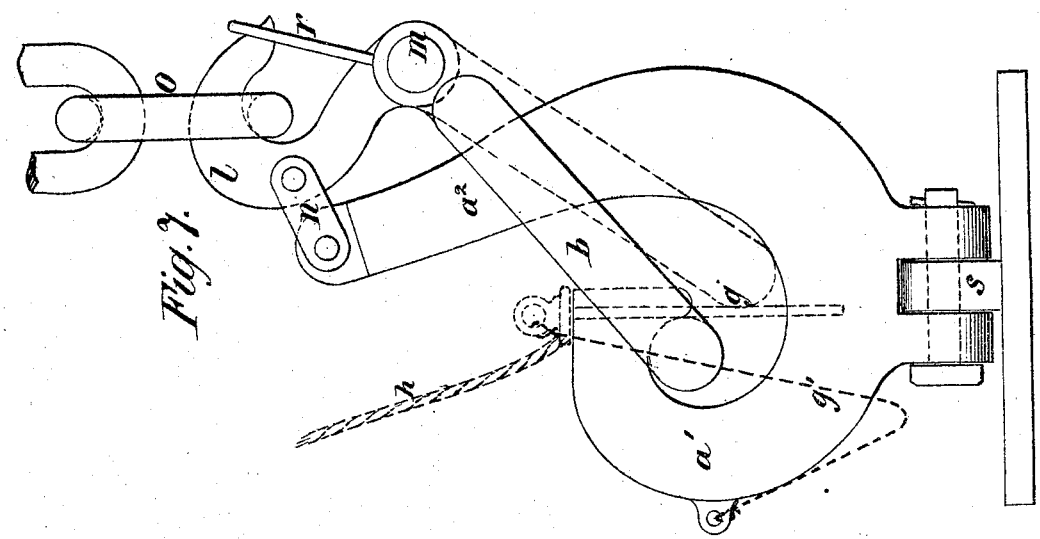
Witnesses:
John Becker.
Alex F. Roberts
Inventor:
E. J. Hill
Per
Attorneys.

UNITED STATES PATENT OFFICE.

EDWARD J. HILL, OF PIMLICO, ENGLAND.

IMPROVEMENT IN BOAT-DETACHING APPARATUS.

Specification forming part of Letters Patent No. 132,007, dated October 8, 1872.

*To all whom it may concern:*

Be it known that I, EDWARD JACOB HILL, of Pimlico, in the county of Middlesex, England, have invented certain Improved Self-Acting Boat-Detaching Apparatus, of which the following is a specification:

My invention relates to improved means of automatically detaching a ship's boat immediately it is lowered into the water. In carrying out my invention I employ a peculiar contrivance which, for convenience of description, I shall divide into two parts, termed the slip-hook and the slip-ring, respectively. This contrivance is the chief means whereby the automatic detachment of the boat is insured. It is combined with the boat and boat-lowering tackle, as hereinafter fully described, on reference to the accompanying drawing, in which—

Figure 1 shows (in black lines) a ship's boat suspended from the davits of the ship, part of the side of the boat being represented as broken away to show the automatic detaching apparatus of my invention, with which the lowering-tackle is provided at each end of the boat. In the same figure the boat is shown (in dotted lines) lowered almost into the water, in readiness to be automatically detached as soon as it is floated, and also, (in dotted lines,) quite lowered, and detached from the ship. Fig. 2 is a view, on a larger scale, of one hook with its slip-ring attached, showing more clearly its construction and the manner in which it becomes detached. Fig. 3 shows the slip-ring detached.

A A are the boat-davits, and B B the boat-lowering tackle, which may be of any suitable or known description. The boat is suspended from the block-tackle by means of an arrangement of ropes or chains, which I term a sling, the purpose of the said sling (which may be variously arranged, as hereinafter described) being to connect the slip-rings together. $a\ a$ are the slip-hooks, and $b\ b$ the slip-rings, which are employed in duplicate in the present arrangement, one toward either end of the boat. Each slip-ring $b$ is made double— that is to say, it is forged in the form shown in Fig. 3, or, preferably, as shown in Fig. $3^a$, in which the two loops are at right angles to one another. In either case, the small loop $b'$ is attached to the nearest block $c$ of the tackle, and the large loop is sometimes made heavier on one side, as shown in Fig. $3^a$, for the purpose of insuring the disconnection of the boat under certain circumstances. In Figs. 1 and 2 the sling consists of a wire-rope, $d$, by which the two blocks $c$ are connected together, and two short chains, $d'$, which may commonly be of the length of two feet, by which the slip-rings $b$ are attached to their respective blocks $c$. The length of the horizontal rope $d$ is less than the distance between the slip-hooks $a$, fixed in the boat, so that when the slip-rings are engaged in the slip-hooks, and the boat is suspended, the chains $d'$ each stretch out at an angle with the rope $d$, as shown. The ends of rope $d$ are merely hooked to the blocks $c$ by hooks $u'$, formed on the under side of the first link or shackle $u'$ of chains $d'$, a loop being made at each end of rope $d$ around a thimble fitting loosely on hooks $u$, so that when the slip-rings $b$ disconnect from the slip-hooks $a$, the rope $d$ will be detached from the blocks $c$ and fall into the boat, thereby avoiding any chance of the rope $d$ dragging a man overboard. The slip-hooks $a$ are fixed to the boat, one at either end. The hook $a$ is pivoted in a shackle or link, $f$, and is free to incline itself to the direction of the strain. The shackle $f$ is connected to chains $f^1$, and is supported in position by the tension of side stays attached to eyes $f^2$ on either side of shackle $f$, extending to the gunwale of the boat; or, the hook $a$ may be pivoted to a bolt, $f$, fixed through the stem or stern-post of the boat, as shown in Fig. 4. The slip-hook $a$ consists of a curved or hook-shaped part, $a^1$, in which the slip-ring engages, and an upright guard, $a^2$, over which the slip-ring $b$ is passed, as shown, the strain being shared by the parts $a^1\ a^2$. The guard $a^2$ serves to render it impossible for the slip-ring to again engage itself with the hook $a^1$, when once, by the slackening of the chains, it has become detached or fallen into the dotted position shown in Fig. 2. Thus, immediately the boat is fairly floated and the sling-chains are released from its weight they slacken, and allow the slip-rings to fall into the dotted position, whereby the boat is instantaneously and automatically detached by the act of lowering the boat into the water. Should, however, the boat be lifted by a wave at one end only, while the other end remains suspended, the boat cannot be detached at either end, because, by the coupling of the two davit-blocks $c\ c$, the sling-chains are always kept taut, and a strain maintained on both slip-hooks by the weight of the suspended end of the boat, so that neither slip-hook can slacken and become detached until the boat is fairly floated; but if both ends of the boat are lifted by a wave, no matter how momentarily, both chains $d'$ of the sling will slacken themselves, and both slip-hooks will become disengaged. If the boat be lowered when the vessel has way on, the boat, although fairly floated, may cause slight tension on the chains $d$; but even then the boat will still be detached, by reason of the ring $b$ being weighted on one side, as before mentioned, which causes the ring to cant and detach itself. The boat will then be free to leave the vessel. To prevent the slip-ring becoming accidentally disconnected at any time, a safety pin or bolt, $g$, is applied to the hooked part $a^1$ of each slip-hook $a$. Pin $g$ is attached, by a short piece of chain or cord, $g'$, to the curved part of hook $a$. The pin passes through a socket in $a^1$ and inside the slip-ring $b$, which is thereby prevented from falling into the dotted position. The pin $g$ may be withdrawn, either by hand or automatically, by means of a chain or cord, $h$, attached to the guys of the davits and terminating in a ring which is passed under the head of the pin, as shown in Fig. 2. In the boat shown in dotted lines in Fig. 1 the pins $g$ are shown withdrawn by the act of lowering the boat. In place of this safety-pin a piece of spun yarn or cord may be tied round the ring $b$, to prevent the release of said ring from hook $a$, which yarn or cord may be removed either by cutting or otherwise at the time of lowering the boat.

Fig. 4 shows part of a slightly-modified arrangement. In this view only one slip-hook is seen, but it is understood that a similar arrangement is employed at the other end of the boat. The same letters indicate the same parts as before. In this case there are two chains, $d'\ d'$, each of which is attached at one end to one of the blocks $c$, and led through the loop $b'$ of the nearest slip-ring $b$, then back through an eye, $e$, attached to the block, and is connected, by a length of wire-rope, $d$, to the other block $c$. The chains $d'\ d'$ run freely through the loop $b'$ of the slip-ring and through eye $e$, and the said chains and wire-rope composing the sling are made of such length that when the boat is attached the two blocks $c$ will be drawn toward one another, so as to be somewhat nearer together than the two slip-hooks $a$ are, as shown in the other arrangement in Fig. 1. The slip-hook $a$ is bolted to the stem $i$ of the boat. The result of this arrangement and the operation of lowering the boat are much the same as before.

Fig. 5 shows a similar view of another modification of the sling, in which the chain $d'$ is led through an eye, $k$, on the block $c$ and through the loop $b'$ of the slip-ring, both ends of the chain being attached to the horizontal rope $d$, which connects it with the chain $d'$ at the other end of the boat. The chain $d'$ thus forms a triangle, which enables it to take up the slack more quickly, and so keep both slip-hooks from becoming disconnected before both ends of the boat are fairly afloat. Instead of the safety slip-hook before described, either one of these three sling arrangements may be used in connection with simple hooks, of the ordinary description, fixed, in an inverted position, to the ends of the boat, so that the rings $b\ b$ may detach themselves from them when the boat is floated. In this case, also, the boat will not be detached when only one end is supported by the water, but will be detached, when both ends are lifted simultaneously. Instead of being fixed directly to the ends of the boat, the said inverted simple hooks may be attached to shackles supported by chains, as in Fig. 1.

Instead of employing two slip-hooks, I may sometimes employ one only. Fig. 6 shows such an arrangement, the slip-hook being bolted amidships to the keel of the boat.

Figs. 7 and 8 show enlarged views of the hook and its appendages. In this case, in lieu of the loop $b'$ before referred to, the slip-ring is made with a small hook, $l$, hinged to it at $m$, and the said hook $l$ is jointed to the top of the slip-hook $a$ by means of a link, $n$, thereby attaching the slip-ring to the hook $a$, instead of the ring being connected to the lowering tackle, as in the former case. To each of the davit-blocks $c$ a chain, $o$, is attached, the said chains being passed through rings $p$ attached by chains $q$ to the bow and stern ends of the boat, as shown. The chains $o$ meet at the center of the boat, where one chain is first passed through a ring at the end of the other chain and then connected to the hook $l$. $r$ is a guard, fixed to ring $b$, to prevent the chains $o$ being accidentally disconnected from hook $l$. The slip-hook $a$ is hinged at $s$ to its base, to admit of its being folded down out of the way when not in use. A safety-pin, $g$, is applied to the slip-hook, which pin is withdrawn by the act of lowering the boat, as before described, after which, as soon as the boat floats fairly, the slip-ring $b$ disengages itself from the curved part of slip-hook $a$ and falls into the dotted position shown in Fig. 7, when a slight tension on the chain $o$, caused by the motion of the boat, lifts the slip-ring $b$ into the raised position seen in Fig. 8, thus inverting hook $l$ and casting off the chains $o$, which run out through the rings $p$, thereby detaching the boat.

Having thus described my invention, what I claim as new, and desire to secure by Letters Patent, is—

1. The combination, with the said sling and its modifications, of the slip-hooks $a$ and slip-rings $b$, applied to the boat and boat-lowering tackle, substantially as shown and described, in reference to Figs. 1 to 5, for the purpose specified.

2. The point-bent hook *a* and the ring *b*, combined with the lowering-tackle of a ship's boat, as and for the purpose described.

3. The rope *d*, having thimbled end loop, and the link U having hook *u'*, combined and applied as described, to cause the rope *d* to detach readily and certainly from the blocks C as soon as the hooks and rings become disconnected.

EDWARD JACOB HILL.

Witnesses:
W. G. E. SWINNOCK,
JAS. O. DEWEY,
    53 *Chancery Lane, London.*